United States Patent
Aoki (10) Patent No.: US 9,141,324 B2
(45) Date of Patent: Sep. 22, 2015

(54) OUTPUTTING SELECTIVE ELEMENTS OF A STRUCTURED DOCUMENT

(75) Inventor: Nobushige Aoki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 12/906,924

(22) Filed: Oct. 18, 2010

(65) Prior Publication Data

US 2011/0035657 A1    Feb. 10, 2011

Related U.S. Application Data

(63) Continuation of application No. PCT/JP2010/059716, filed on Jun. 8, 2010.

(30) Foreign Application Priority Data

Jun. 9, 2009 (JP) ................................. 2009-138398

(51) Int. Cl.
G06F 17/20 (2006.01)
G06F 3/12 (2006.01)
G06F 17/22 (2006.01)

(52) U.S. Cl.
CPC ............ *G06F 3/1288* (2013.01); *G06F 3/1204* (2013.01); *G06F 3/1246* (2013.01); *G06F 17/2247* (2013.01)

(58) Field of Classification Search
CPC .................................................. G06F 3/1242
USPC .................. 715/234, 251, 253, 269, 531, 530
See application file for complete search history.

(56) References Cited

U.S. PATENT DOCUMENTS

| 6,973,458 | B1 | 12/2005 | Maeda et al. |
| 7,249,319 | B1 * | 7/2007 | Payne et al. .................... 715/209 |
| 7,685,514 | B1 | 3/2010 | Khatwani et al. |
| 7,903,277 | B2 * | 3/2011 | Cudd et al. .................... 358/1.18 |
| 2002/0007367 | A1 * | 1/2002 | Narahara ...................... 707/500 |
| 2002/0069260 | A1 * | 6/2002 | Tagg ............................. 709/218 |
| 2004/0174563 | A1 * | 9/2004 | Cassidy et al. ............... 358/1.18 |
| 2005/0262441 | A1 * | 11/2005 | Yoon ............................. 715/526 |
| 2007/0124670 | A1 * | 5/2007 | Finck et al. .................... 715/526 |
| 2008/0046833 | A1 * | 2/2008 | Patz et al. ...................... 715/769 |
| 2008/0055613 | A1 * | 3/2008 | Hatfield ......................... 358/1.2 |
| 2009/0138810 | A1 * | 5/2009 | Howard et al. ................ 715/760 |
| 2010/0281351 | A1 * | 11/2010 | Mohammed .................. 715/205 |
| 2011/0075164 | A1 * | 3/2011 | Nordback ...................... 358/1.9 |
| 2013/0159889 | A1 * | 6/2013 | Zheng et al. .................. 715/760 |

FOREIGN PATENT DOCUMENTS

AU    2004201773 A1 *  6/2004
JP    05-143588 A       6/1993

(Continued)

*Primary Examiner* — Cesar Paula
*Assistant Examiner* — Mohammed-Ibrahim Zuberi
(74) *Attorney, Agent, or Firm* — Canon USA Inc. IP Division

(57) ABSTRACT

Information representing content of a plurality of elements which are included in a structured document defined as a layer structure is obtained, and one of the elements included in the structured document is selected in accordance with the content of the elements included in the structured document. Then, the selected element is output separately from the other elements.

Note that the elements included in the structured document are selectable in the plurality of layers and an element selected from any one of the layers is output separately from the other elements.

By this, an appropriate element can be selected and output from among the plurality of elements included in the structured document.

33 Claims, 10 Drawing Sheets

(56) References Cited

FOREIGN PATENT DOCUMENTS

| | | |
|---|---|---|
| JP | 2000-155756 A | 6/2000 |
| JP | 2002-063013 A | 2/2002 |
| JP | 2003-084951 A | 3/2003 |
| JP | 2004-086849 A | 3/2004 |
| JP | 3588337 B | 11/2004 |
| JP | 2006-260541 A | 9/2006 |
| JP | 2007-011513 A | 1/2007 |
| JP | 5483934 B2 | 5/2014 |

* cited by examiner

```
<!DOCTYPE html PUBLIC "-//XXX//DTD XHTML 1.0 Transitional//EN" "http://www.xxx.xxx.xxx/TR/xhtml1/DTD/xhtml1-transitional.dtd">   ~401
<html xmlns="http://www.xxx.xxx.xxx/xhtml" xml:lang="ja" lang="ja">
<head>
<meta http-equiv="Content-Type" content="text/html; charset=UTF-8"/>
<link rel="stylesheet" type="text/css" href="top_j.css"/>
<title>SAMPLE PAGE</title>
</head>
<body>
<div id="head">
<p>2008/01/01</p>
</div>
<div id="container">
<div id="menu">
<ul>
<li><a href="top_01.html">PRODUCT INFORMATION</a></li>
<li><a href="top_02.html">SOLUTION</a></li>
<li><a href="top_03.html">SUPPORT</a></li>
<li><a href="top_04.html">DOWNLOAD</a></li>
<li><a href="top_05.html">EVENT</a></li>
</ul>
</div>
<div id="category">
<ul>
<li><a href="/product/camera/index.html"><img src="images/button_camera.gif" alt="CAMERA" border="0" /></a></li>
<li><a href="/product/printer/index.html"><img src="images/button_printer.gif" alt="PRINTER" border="0" /></a></li>
<li><a href="/product/scanner/index.html"><img src="images/button_scanner.gif" alt="SCANNER" border="0" /></a></li>
<li><a href="/product/copy/index.html"><img src="images/button_copy.gif" alt="COPY" border="0" /></a></li>
<li><img src="/product/other/index.html"><img src="images/button_other.gif" alt="OTHERS" border="0" /></li>
</ul>
</div>
</div>
 · · · <OMITTED> · · ·
</body>
</html>
```

OUTPUTTING SELECTIVE ELEMENTS OF A STRUCTURED DOCUMENT

This application is a Continuation of International Application No. PCT/JP2010/059716, filed Jun. 8, 2010, which claims the benefit of Japanese Patent Application No. 2009-138398, filed Jun. 9, 2009, both of which are hereby incorporated by reference herein in their entirety.

TECHNICAL FIELD

The present invention relates to an image processing apparatus which outputs an element included in a structured document.

BACKGROUND ART

In recent years, people can access servers through the Internet and obtain various information from displayed web pages. The web pages are represented by structured documents described by a structured language (markup language) such as an HTML (Hyper Text Markup Language) or an XHTML (Extensible Hyper Text Markup Language). Then, the structured documents are analyzed by software referred to as a browser and the browser performs display in accordance with analysis results whereby the web pages can be displayed.

Furthermore, when such a web page is to be printed, a certain region of a web page selected by a user may be printed. For example, Japanese Patent No. 03588337 discloses a technique of copying an element included in a structured document such as text or an image corresponding to a portion of a web page selected in response to a selection of a certain rectangle portion included in the web page performed by a user using a pointing device such as a mouse so that a new structured document is generated. Furthermore, Japanese Patent No. 03588337 discloses a method for displaying only text or an image selected by the user in accordance with the newly-generated structured document.

CITATION LIST

Patent Literature

PTL 1 Japanese Patent No. 03588337

However, in the method disclosed in Patent Literature 1, the user has to specify a region in a web page so as to select an element included in a structured document. Therefore, a technique which facilitates an operation performed by the user to select an element included in a structured document has been demanded.

Accordingly, the present invention provides an image processing apparatus which selects an appropriate element from among a plurality of elements included in a structured document and which outputs the appropriate element.

SUMMARY OF INVENTION

An image processing apparatus includes an obtaining unit configured to obtain information representing content of a plurality of elements which are included in a structured document defined as a layer structure, a selecting unit configured to selecting one of the elements included in the structured document for each layer in accordance with the content of the elements which are included in the structured document, the content being represented by the information obtained by the obtaining unit, and an outputting unit configured to output an element selected from one of the layers by the selecting unit separately from the other elements.

Further features of the present invention will become apparent from the following description of exemplary embodiments with reference to the attached drawings.

DESCRIPTION OF EMBODIMENTS

Hereinafter, preferred embodiments of the present invention will be described in detail with reference to the accompanying drawings. Note that embodiments below do not limit the present invention according to claims and it is not necessarily the case that all combinations of characteristics described in the embodiments are required for solving means of the present invention.

Figure 1:
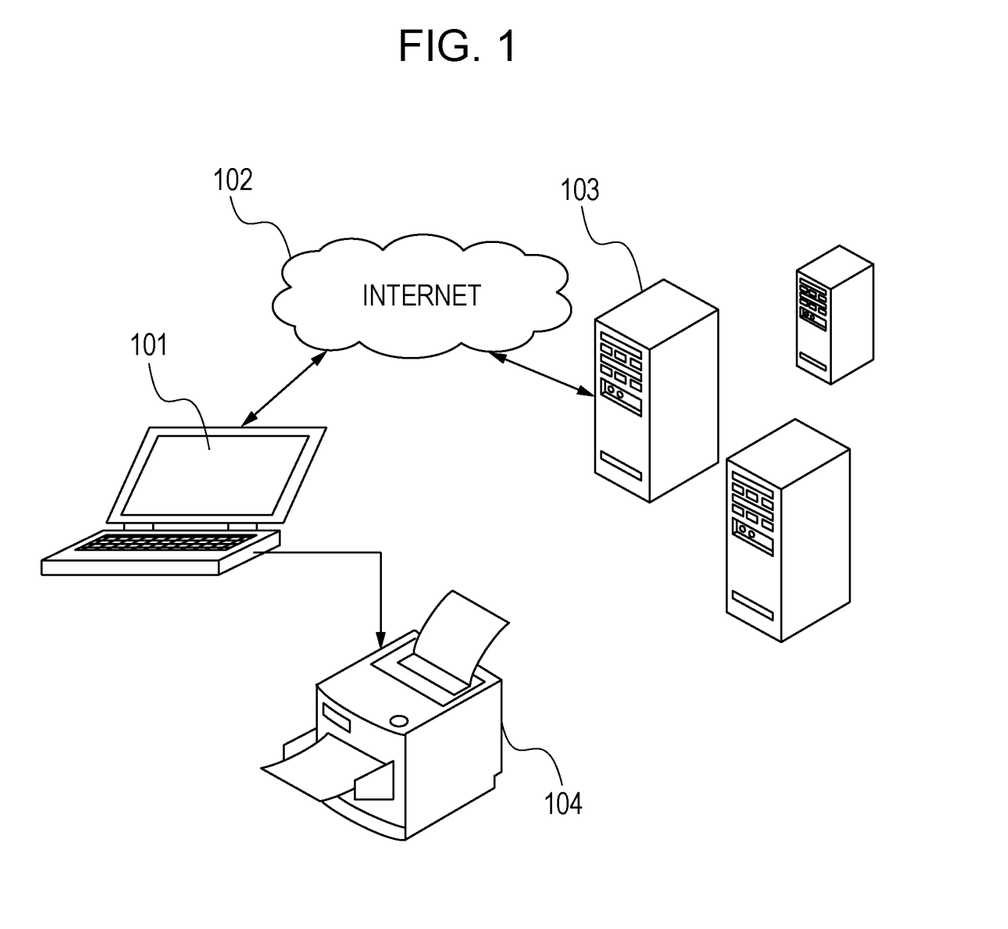
FIG. 1 is a diagram illustrating a print system in which printing is performed in accordance with a structured document.

FIG. 1 is a diagram illustrating a print system in which printing is performed in accordance with a structured document. A PC (Personal Computer) 101 serving as a print control apparatus is connected to a printer 104 and causes the printer 104 to print an image. Furthermore, the PC 101 is connected to a www server 103 through the Internet 102 and downloads a structured document described in a structured language (markup language) so as to display a web page in accordance with the structured document. Note that the structured document is described in an HTML, an XHTML, or the like. Furthermore, in accordance with the downloaded structured document, the PC 101 causes the printer 104 to print an image.

Figure 2:
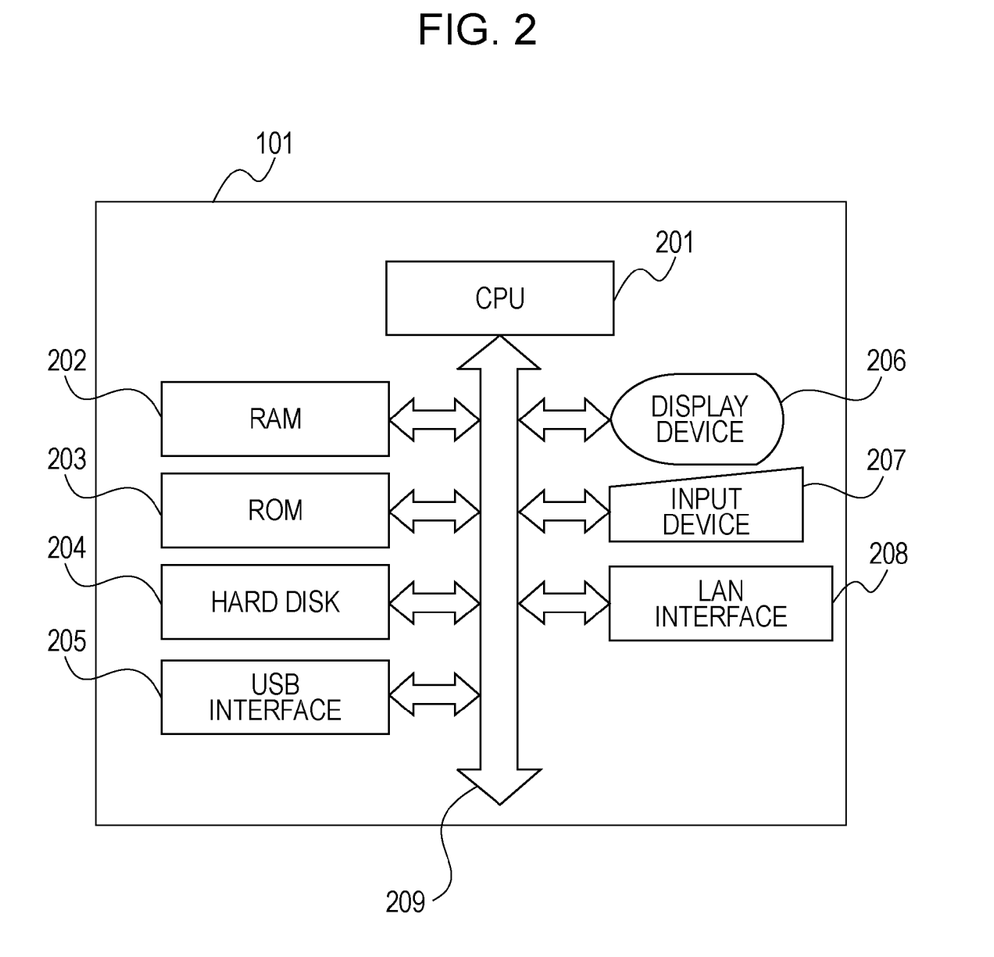
FIG. 2 is a block diagram illustrating a configuration of a PC 101.

FIG. 2 is a block diagram illustrating a configuration of the PC 101. A CPU 201 performs data calculation and an instruction in accordance with programs so as to control various sections of the PC 101 and devices connected thereto. A RAM 202 is used as a temporary storage region and a ROM 203 stores various programs to be executed by the CPU 201. A hard disk 204 records programs of an operating system (OS) and a browser, other application software programs, and data therein. That is, the CPU 201 reads programs stored in the ROM 203 or the hard disk 204 to the RAM 202 and executes the programs using the RAM 202 as a work memory whereby various control operations are performed.

A USB interface 205 is connected to an USB cable and used for data communication with the printer 104. Note that the communication with the printer 104 may be performed by a SCSI or wireless communication instead of the USB cable.

A display device 206 is constituted by a CRT or a liquid crystal display and a graphic controller, and displays a web page downloaded from the www server 103, a print preview image, or a graphic user interface (GUI). An input device 207 including a mouse and a keyboard is used by a user to issue various instructions to the PC 101. A system bus 209 is used for data communication among the CPU 201, the RAM 202, the ROM 203, and the hard disk 204.

A LAN interface 208 is connected to a LAN cable and performs data communication with the external www server 103 through a rooter, not shown, or the Internet 102. Note that this data communication may be performed by wireless communication using an interface which supports the wireless communication, for example.

Furthermore, FIG. 2 shows a case where a so-called laptop PC which is configured such that the PC 101 integrally includes the display device 206, the input device 207, and a control unit including the CPU 201, the RAM 202, and the like is used. However, the present invention is not limited to this, and a so-called desktop PC in which a display device and an input device are separated from a control unit may be employed.

Figure 3:
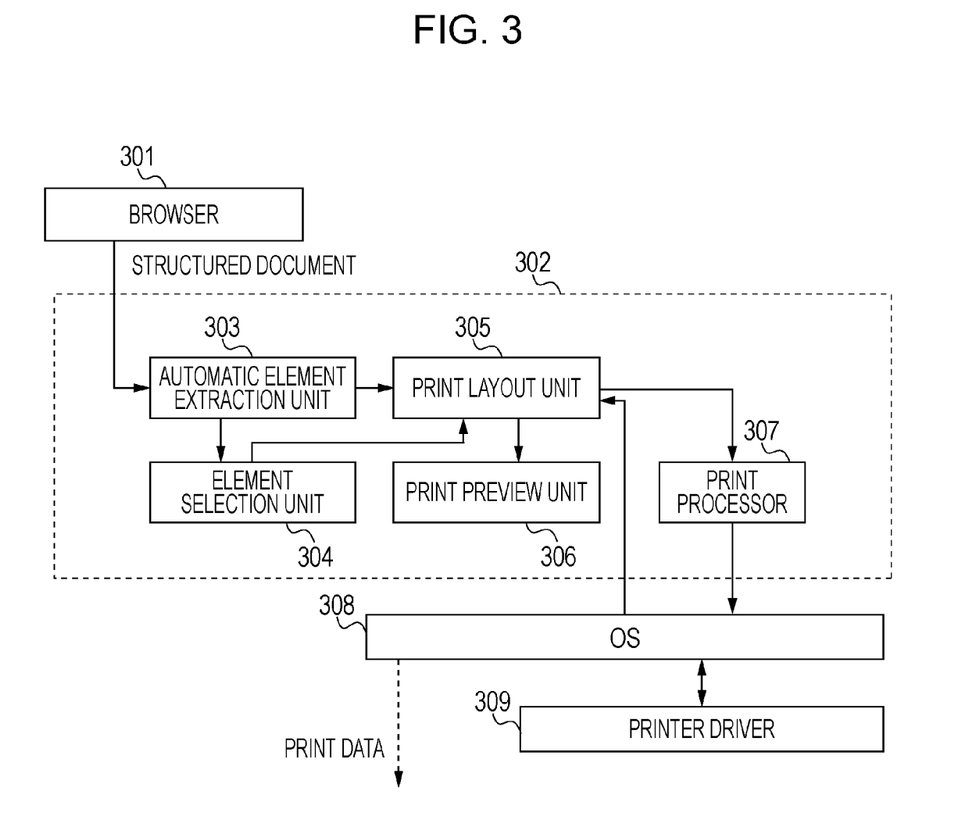
FIG. 3 is a block diagram illustrating a configuration of software of the PC 101.

FIG. 3 is a block diagram illustrating a configuration of software of the PC 101. Blocks shown in FIG. 3 are obtained by classifying programs stored in the ROM 203 and the hard disk 204 according to functions and the programs are executed by the CPU 201. Hereinafter, the programs operated in the PC 101 and data processing configurations thereof will be described hereinafter with reference to FIG. 3. In FIG. 3, a browser 301 which is an application used to display a web page downloads a structured document stored in the www server 103 to the hard disk 204 of the PC 101 and displays the web page in the display device 206 in accordance with an analysis result. A structured document file to be downloaded is described by the HTML or the XHTML, and elements which constitute the structured document such as text and images are described using tags.

Figure 4:
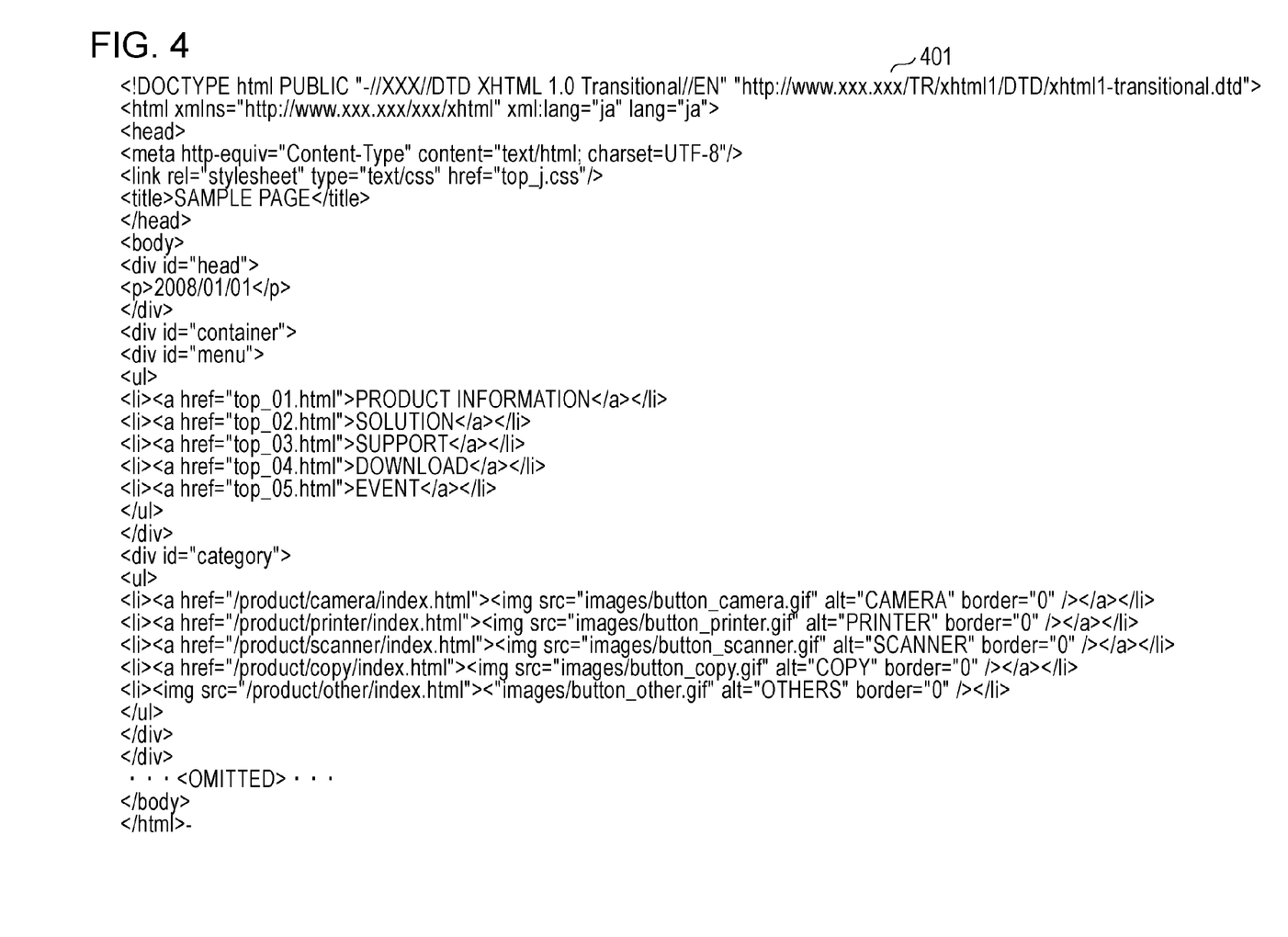
FIG. 4 is a diagram illustrating a structured document.

FIG. 4 is a diagram illustrating a structured document. In FIG. 4, a structured document 401 is described by an XHTML format. Furthermore, another file which is referred to as Cascading Style Sheet (hereinafter referred to as "CSS") which specifies a display style of elements included the structured document is specified in the structured document. The browser 301 analyzes the structured document file and displays a web page in the display device 206.

In FIG. 3, a structured document print module 302 is plug-in software called by the browser 301. When the user issues an instruction for automatically extracting an element to the browser 301, the structured document print module 302 is executed. Note that the automatic extraction of an element corresponds to a process of extracting an element serving as a main element of information included in a web page and determining the element as a print target region. The process will be described in detail hereinafter.

In the structured document print module 302, an automatic element extraction unit 303 analyzes elements included in a structured document and stores layer-structure data of the elements which is referred to a DOM (Document Object Model) tree in the temporary storage region such as the RAM 202.

Figure 5:
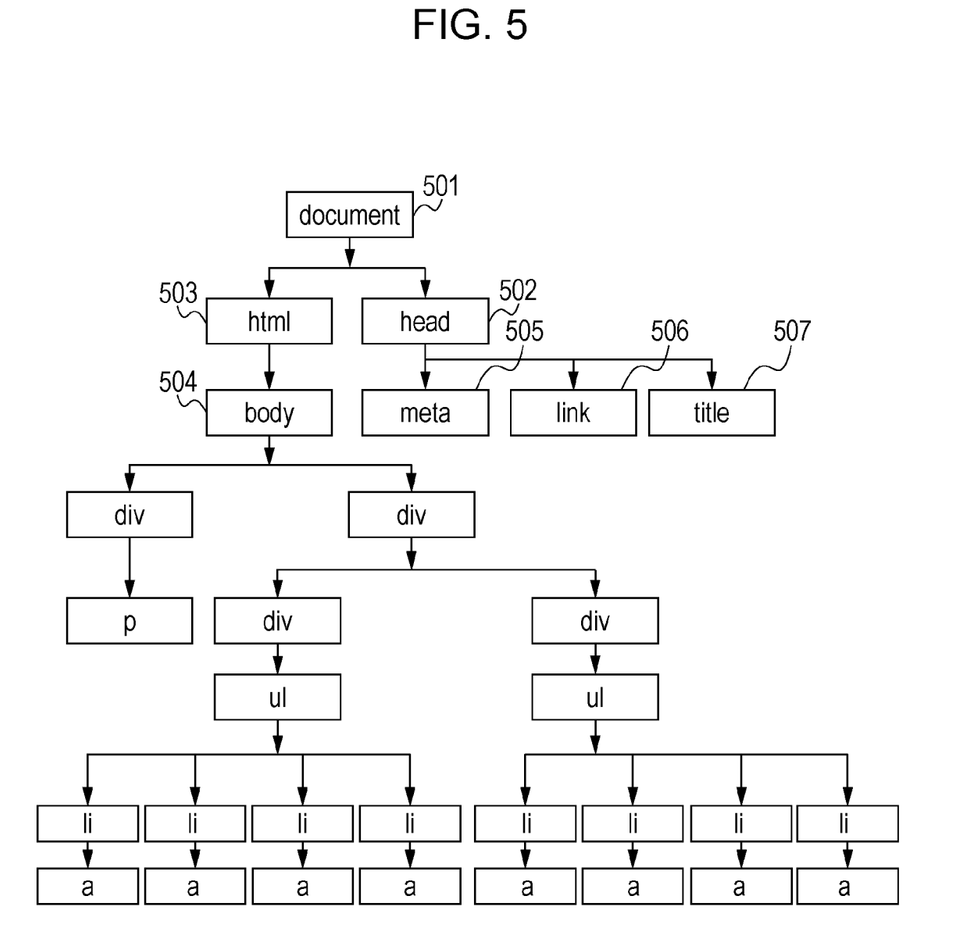
FIG. 5 is a diagram illustrating a DOM tree of the structured document.

FIG. 5 is a diagram illustrating the DOM tree of the structured document. The DOM tree represents a data structure of the structured document and shows the elements included in the structured document and a layer structure of the structured document. The automatic element extraction unit 303 analyzes the elements included in the structured document and the layer structure and the DOM tree is stored in the temporary storage region.

In FIG. 5, the DOM tree of the structured document 401 includes a "document" node 501 as a root node representing the entire document and a "head" node 502 and an "html" node 503 as child nodes. Furthermore, the "html" node 503 includes a "body" node 504 as a child node. Moreover, each of element nodes has data such as a pointer pointing a parent element node, a pointer pointing a brother element node, a pointer pointing a child element node list, attribute information, and text information. Furthermore, display states of the elements and layout information are defined in a CSS file, and the information is stored in the temporary storage region as information on the element nodes of the DOM tree. The information on the element nodes includes a font type, a font size, a text color, and a display position, for example.

Furthermore, in accordance with the DOM tree, the automatic element extraction unit 303 refers to areas occupied by the respective elements in the web page, a text amount, text ratios relative to areas occupied by the elements, a tag type, and a tag attribute so as to specify one or more elements serving as main portions of the information included in the web page. Hereinafter, elements serving as the main portions of the information included in the web page are referred to as a main element group, and one of the main portions included in the main element group which is the most important element is referred to as a main element. In this embodiment, the main element and the main element group are preferentially selectable as print target candidates. Specifically, when a certain region of the web page is to be printed, it is highly possible that the user desires to print one of the main elements of the web page. Therefore, the main elements included in the web page are preferentially selected.

Note that the text amounts herein represent data amounts of text information actually displayed in the browser among the text information included in the elements. Furthermore, the text ratios represent ratios of the text amounts relative to entire tag sizes of the elements. For example, when an element represents an advertisement included in the web page, it is highly possible that a link to another web page is included. In this case, since the text information of the element includes a large amount of information assigned to the link such as a URL, a ratio of the text information displayed in the browser relative to an entire tag size of the element is low. Therefore, a result of a determination as to whether the target element is an advertisement can be estimated in accordance with the text ratio described above. Accordingly, it can be determined whether it is highly possible that the user desires to print the target element.

An element selection unit 304 provides a display effect for specifying one or more main element group or one or more main elements which are included in the web site and which are extracted by the automatic element extraction unit 303 in the GUI screen displayed in the display device 206. In this embodiment, an element which has been subjected to the display effect corresponds to a print target, and therefore, the main element and the main element group correspond to print targets. The user may change an element to be subjected to the effect in the GUI screen using the input device 207 such as the mouse or the keyboard so as to change an element serving as the print target.

Then, when an instruction for determining an element serving as a print target is supplied from the input device 207 to the element selection unit 304, the element selection unit 304 supplies information used to specify an element serving as a print target to a print layout unit 305 in accordance with the received instruction.

The print layout unit 305 determines layout of the element which is included in the main element group and which is specified as the print target on a sheet in accordance with the main element extracted by the automatic element extraction unit 303 or the information supplied from the element selection unit 304. The layout is determined in accordance with a print setting. The print setting includes information on a sheet size, a resolution, and a printable region relative to the sheet size, and the like. Note that information representing the print setting is obtained from a printer driver 309 through an OS 308.

A print preview unit 306 displays an image in which an element is arranged in accordance with the layout determined by the print layout unit 305 as a print preview image in the display device 206. When receiving a print starting instruction, a print processor 307 causes a printer driver 309 to perform a rendering process through the OS 308 in accordance with element arrangement information obtained from the print layout unit 305.

The OS 308 provides an API (Application Programming Interface) used to perform transmission and reception of print setting data between the structured document print module 302 and the printer driver 309 and an API used to perform the rendering process. Furthermore, although the OS 308 includes various control software such as a spooler system which manages print jobs and a port monitor which outputs printer commands to ports, detailed descriptions thereof are omitted.

The printer driver 309 generates print data in accordance with the rendering process executed by the print processor 307 and converts the print data into a printer command. Then, the printer driver 309 supplies the printer command obtained through the conversion to the printer 104 through the OS 308 so that printing is performed on a sheet.

Figure 6:
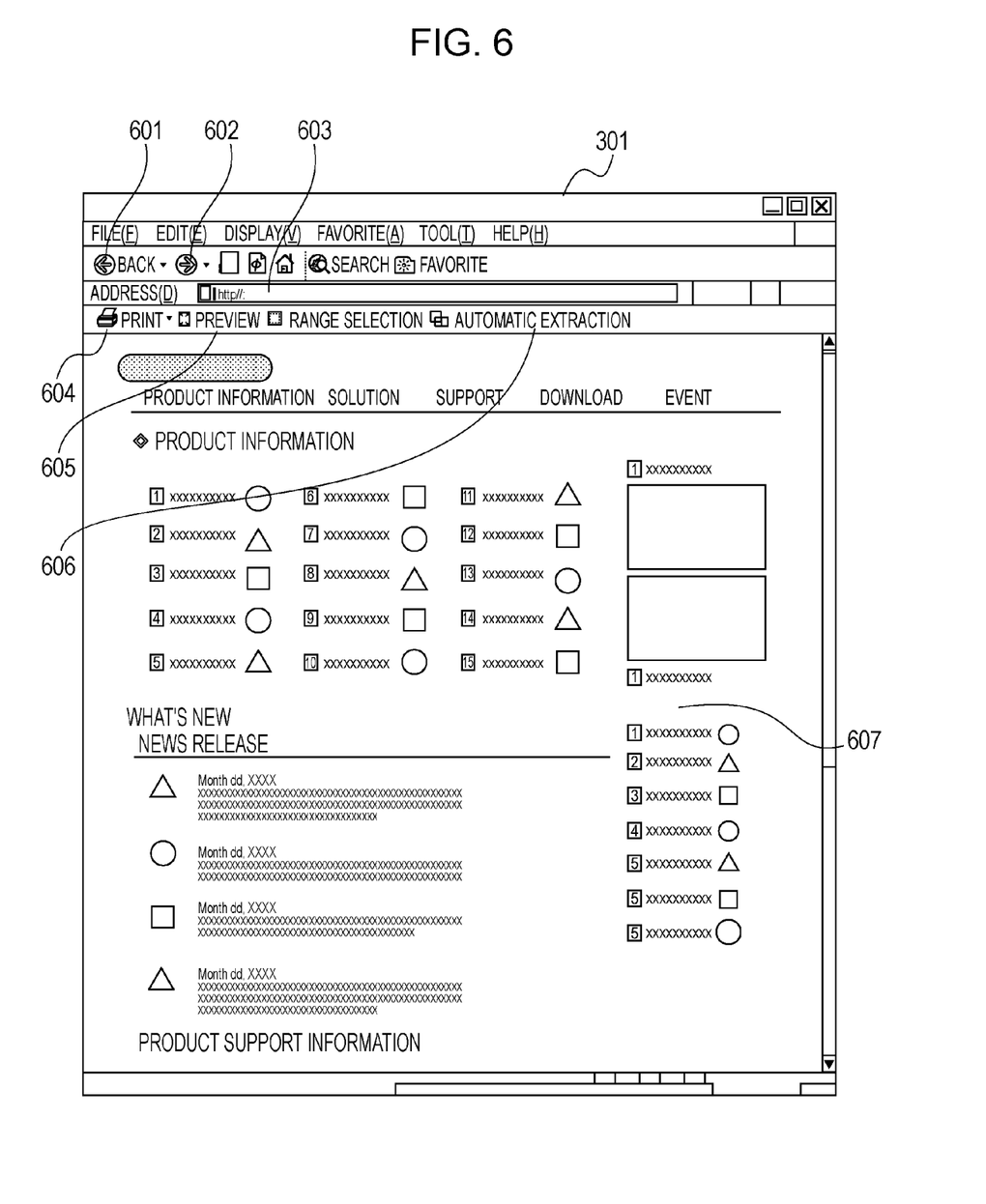
FIG. 6 is a diagram illustrating a GUI screen.
Figure 7A:
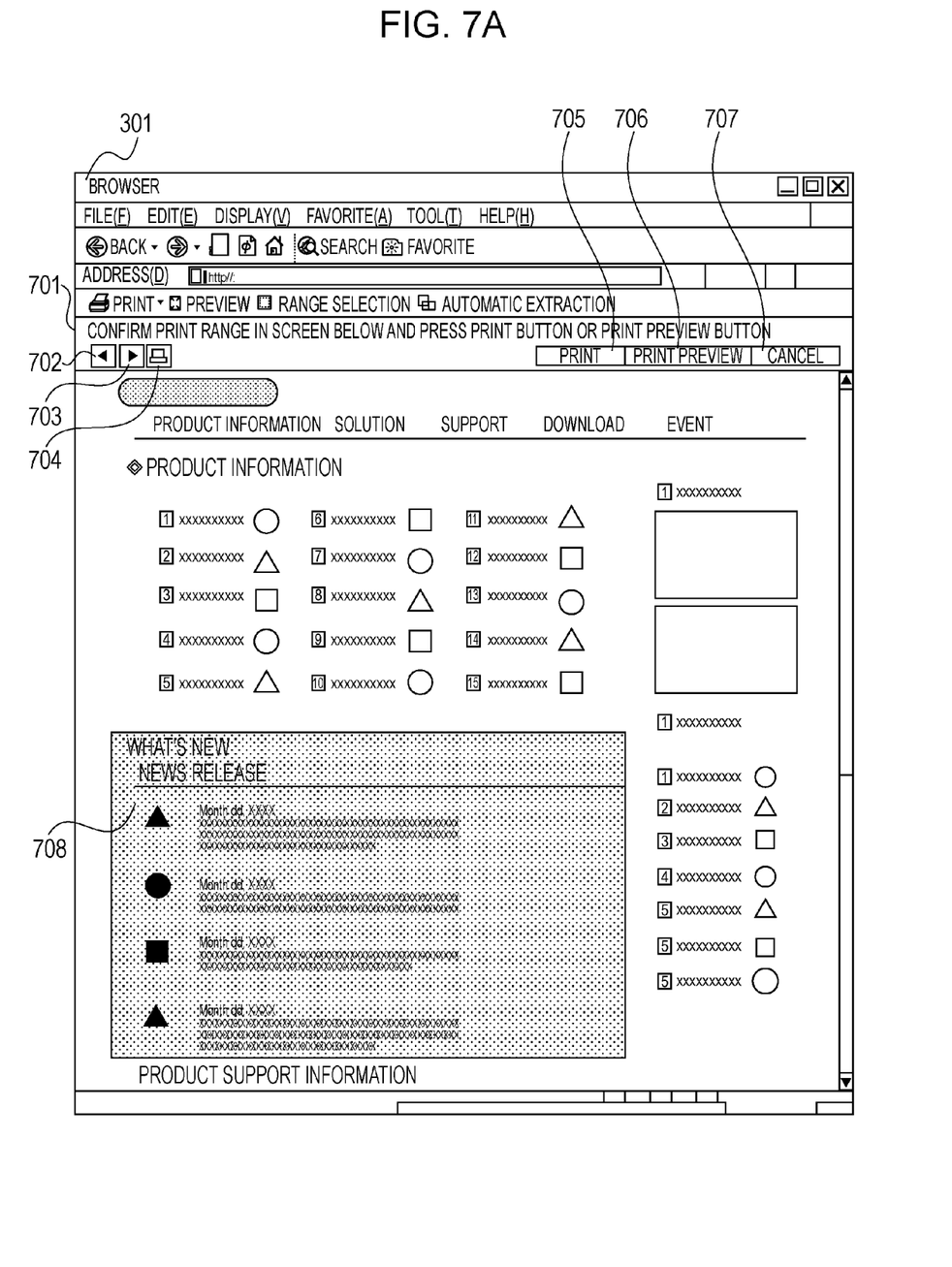
FIG. 7A is a diagram illustrating a GUI screen subjected to display effect so that a main element is specified.
Figure 7B:
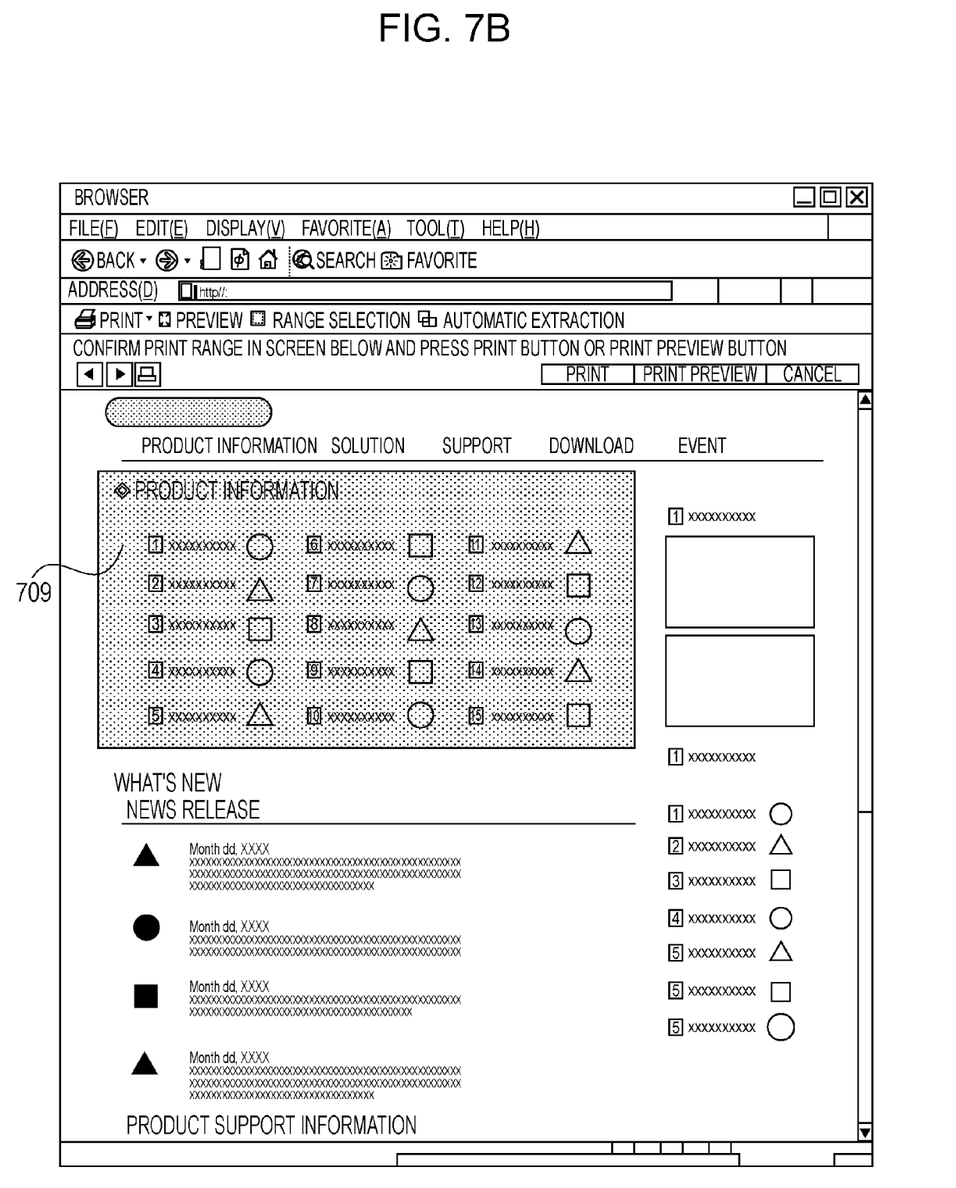
FIG. 7B is a diagram illustrating the GUI screen subjected to display effect so that another main element is specified.

Referring now to FIG. 6 and FIGS. 7A and 7B, a GUI screen used to select a print target to be displayed under display control of the element selection unit 304 will be described. FIG. 6 is a diagram illustrating a GUI screen. The browser 301 includes a back button 601, a forward button 602, and an address input region 603 which are used to change a web page to be displayed. The browser 301 further includes a print button 604, a print preview button 605, and an automatic extraction button 606. The automatic extraction button 606 is used to execute a function of automatically extracting a main element group included in the structured document. When the user presses the automatic extraction button 606, the browser 301 calls the structured document print module 302 using a structured document file of a web page being displayed as a parameter. The structured document print module 302 extracts a main element group and a main element from the specified structured document file to be displayed in the browser 301. The process of extracting the main element and the main element group will be described in detail with reference to FIG. 9 hereinafter.

FIGS. 7A and 7B are diagrams illustrating a GUI screen subjected to display effect for specifying a main element. In FIGS. 7A and 7B, a region of a main element 708 extracted by the automatic element extraction unit 303 is displayed by being synthesized with a translucent rectangle. Furthermore, the browser 301 includes a "next" button 702 and a "back" button 703 which are used to select another element included in the main element group and a "thumbnail display" button 704 used to display a list of main element groups as thumbnails. For example, in the state shown in FIG. 6, when the automatic extraction button 606 is selected, first, the main element 708 is synthesized with a translucent rectangle, for example, as shown in FIG. 7A. Thereafter, when the "next" button 702 is selected, another element 709 is synthesized with a translucent rectangle as shown in FIG. 7B.

Furthermore, the GUI screen shown in FIGS. 7A and 7B includes a print button 705 used to print the main element serving as a print target and a print preview button 706 used to start print preview. In addition, a cancel button 707 used to stop display of the main element is displayed at the same time. When the cancel button 707 is selected, a state of the GUI screen is back to the state shown in FIG. 6. Furthermore, a size and a position of the region of the main element 708 shown in FIG. 7A can be manually controlled by dragging the mouse in the browser 301.

Figure 8:
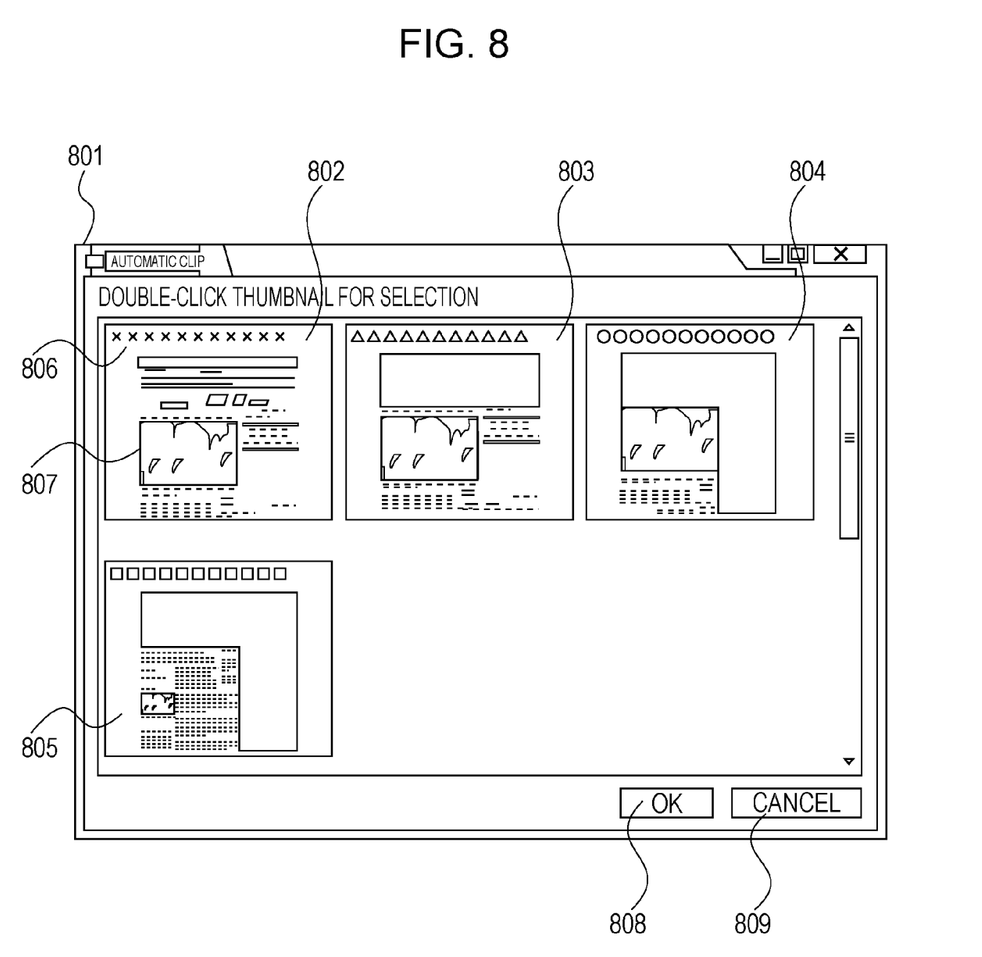
FIG. 8 is a diagram illustrating a GUI screen which displays a list of thumbnail images representing main elements.

FIG. 8 is a diagram illustrating a GUI screen which displays a list of thumbnail images representing main elements. When the user selects the "thumbnail display" button 704 in the browser 301, the screen shown in FIG. 8 is displayed. A thumbnail list screen 801 represented by the GUI screen includes thumbnail images 802 to 805 and the thumbnail images represent a web page. Among the thumbnail images, a region 807 which is synthesized with a translucent rectangle represents a print target element. Each of the thumbnail images includes a region 806 for displaying text included in the main element group serving as a print target, and the element corresponding to the print target can be recognized according to the text. The user selects one of the thumbnail images included in the GUI screen so as to determine a print target element.

Note that the GUI screen shown in FIGS. 7A and 7B and the GUI screen shown in FIG. 8 may be displayed in combination. Specifically, in a GUI screen, a region representing the print target element in the web page shown in FIGS. 7A and 7B and a region including the thumbnail images of the web page which includes the print target element and which can be selected by the user are included. Then, when one of the thumbnail images is selected, content of the web page represented by the selected thumbnail image is reflected to a region in which the web page is displayed. By this, the user can easily select the print target element using the thumbnail and can check content of the print target element in the web page.

Note that, instead of the display of the region serving as the print target by effectively changing a color of a portion of the web page as shown in FIGS. 7A, 7B, and 8, elements other than the print target may be deleted so that only the print target element is displayed. Furthermore, as described above, instead of the operation of selecting a candidate of a print target region performed by the user, an operation of automatically selecting a print region may be employed. Moreover, the print target element is distinctively displayed so that the user can check a region to be printed in advance. However, the display may be omitted and printing may be immediately performed after the element is automatically extracted. By this, the region which is automatically selected can be printed when the user clicks a predetermined button only once.

Figure 9:
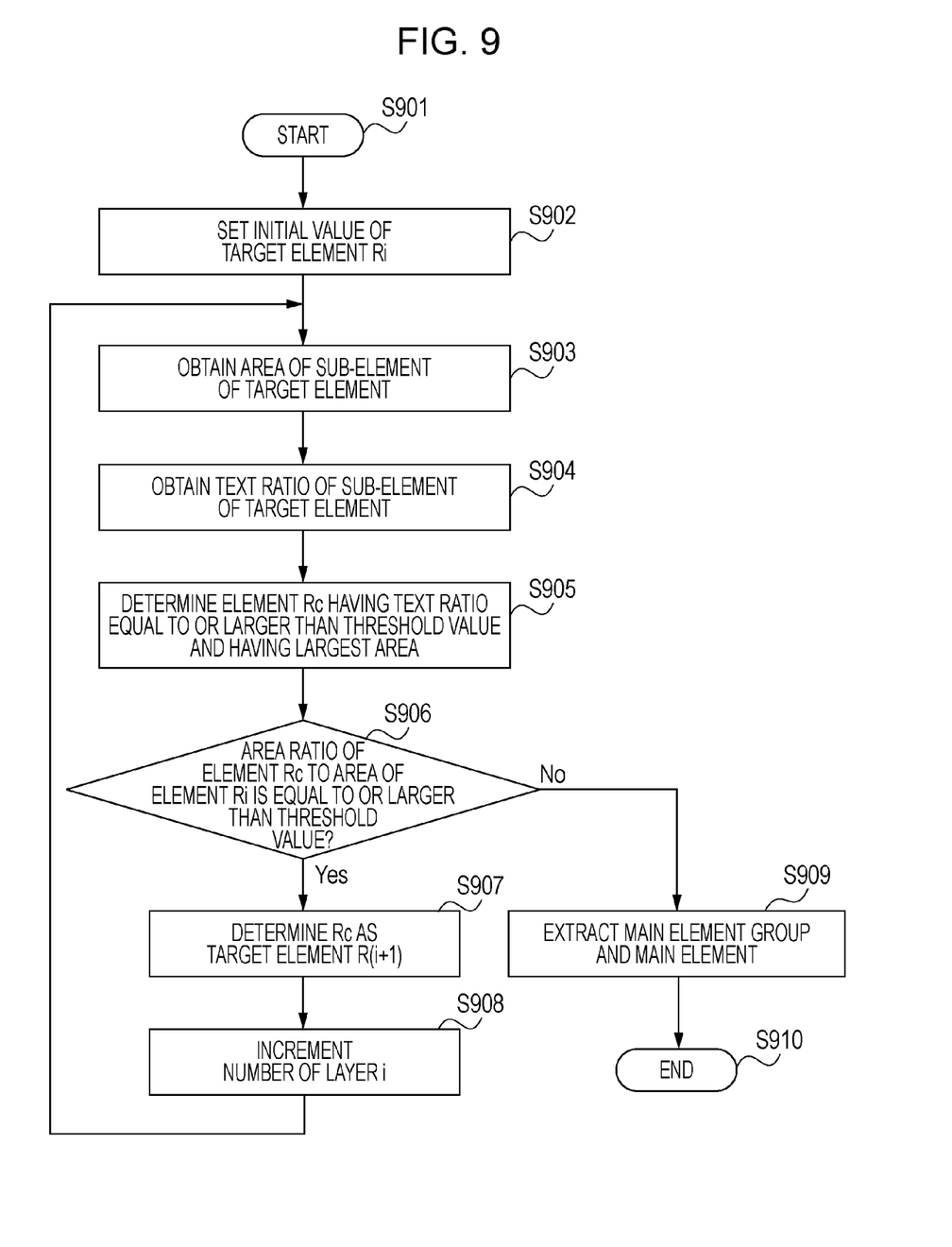
FIG. 9 is a diagram illustrating a procedure of a process of extracting a main element and a main element group of the structured document.

FIG. 9 is a diagram illustrating a procedure of a process of extracting a main element and a main element group of a structured document. Note that the process described in this drawing is performed by the automatic element extraction unit 303 shown in FIG. 3, and a program for executing this process is stored in the ROM 203 or the hard disk 204. When the CPU 201 reads the program to the RAM 202 and executes the program, this process is performed.

First, in step S901, when the automatic extraction button 606 of the browser 301 is selected so that an automatic extraction instruction is issued, the structured document print module 302 is activated and the automatic element extraction unit 303 starts performing the process. In step S902, the automatic element extraction unit 303 sets an initial value of a target element Ri among elements included in a structured document read through the browser 301. Note that the target element Ri corresponds to a candidate of a main element, the variable i represents a number of a layer lower than a layer of a body element of the DOM tree corresponding to the structured document. The larger a value of the layer number is, the lower the layer is. In step S902, the "body" node 504 included in the DOM tree is determined as an initial target element R1 of the target element Ri ("i" is a natural number).

Next, in step S903 to step S908, the automatic element extraction unit 303 extracts a target element from each of the layers starting from the uppermost layer to the lowermost layer of the DOM tree. First, in step S903, widths and heights (a unit of pixel) in the web page of all sub-elements assigned to lower layers under the target element Ri are obtained, and areas in the web page of all the sub-elements assigned to the lower layers under the target element Ri are obtained in accordance with the widths and the heights. Furthermore, in step S904, text amounts and XHTML tag sizes of all the sub-elements of the target element Ri are obtained, and text ratios of all the sub-elements assigned to the lower layers under the target element Ri are obtained in accordance with the text amounts and the XHTML tag sizes.

In step S905, in accordance with the information obtained in step S903 and step S904, among the sub-elements of the target element Ri, an element Rc which has a text ratio equal to or larger than a predetermined threshold value and which has the largest area is determined to be a target element candidate. Then, in step S906, a rate of the area of the element Rc to the area of the element Ri is obtained, and it is determined whether the area rate is equal to or larger than a predetermined threshold value. When the area rate is equal to or larger than the threshold value, the process proceeds to step S907 where the element Rc is determined to be a target element R(i+1). Then, the process proceeds to step S908 where the layer number i is incremented in order to extract a target element in a further lower layer. By repeatedly performing step S903 to step S908, elements R1 to Rn are determined. Note that the threshold values used in the processes performed in step S905 and step S906 are changeable by the user.

Furthermore, when it is determined that the area rate is smaller than the threshold value in step S906, the process proceeds to step S909 where a main element group and a main element are extracted. Specifically, the extracted target elements R1 to Rn are determined to be included in the main element group and especially the element Rn is determined to be a main element. Since it is considered that the main element Rn has the smallest area in the main element group in which regions unnecessary for the user are eliminated as much as possible, the element Rn is determined as a main element. Furthermore, the main element group becomes a print target candidate when the user specifies large area as an element serving as a print target and is extracted when an extraction conditions of the process shown in FIG. 9 is eased.

By performing the processing procedure described above, the automatic element extraction unit 303 analyzes the DOM tree of the structured document on a layer-by-layer basis so as to extract a main element and a main element group. The main element and the main element group extracted in accordance with the processing procedure have the largest areas among the elements and have high text ratios.

Note that, in the extracted main element group, elements assigned to the lower layer correspond to more remarkable elements in the web page, and therefore, it is highly possible that the user determines the elements as print targets. Therefore, when a display effect is used to display a print target element in the web page, elements assigned to lower layers such as the main elements may be preferentially displayed. Furthermore, when thumbnail images representing a page are displayed to be selected as described above, an element assigned to the lowest layer in the main element group may be preferentially selected.

Note that, in the foregoing process, an element can be selected from any one of the layers defined in the structured document. However, the present invention is not limited to this, and an element may be selected from some particular layers defined by the structured document. The specified layers may be predetermined or may be specified by the user.

Furthermore, although the area of the element and the text ratio of the element are used to extract the main element in the above process, a tag type, a tag attribute, and a style of the element may be used to extract the main element. For example, a background of a region corresponding to an element included in a web page or a text size of text included in a text element is obtained in accordance with the tag type and the tag attribute of the element to extract a main element in accordance with the obtained background and the obtained text size.

Moreover, in the foregoing process, the main element is determined by setting the sub-element of the target element as a next target element. Specifically, in the web page, the main element is determined by only using regions corresponding to sub-elements included in a region corresponding to the target element. However, the present invention is not limited to this, and an element which does not correspond to a sub-element of the target element and which is assigned to a layer lower than that of the target element may be determined as a next target element. That is, in a web page, a main element may be determined using a region other than the region corresponding to the target element as a region corresponding to a next target element.

Furthermore, although one target element is extracted from each of the layers of the DOM tree starting from the uppermost layer in the foregoing process, a plurality of target elements may be extracted. In addition, the target element and the main element may be extracted by analyzing all the elements instead of use of the DOM tree.

Furthermore, in the foregoing description, an element automatically extracted is displayed. However, the present invention is not limited to this, and an element which has been automatically extracted may be arranged for printing without displaying the element.

Note that, in the embodiment described above, the main element is extracted from the lower element of the target element. However, in addition to the main element, another element assigned to a layer the same as that of the target element may be extracted as another main element. Specifically, an element included in a region different from that of the target element may be extracted as a main element in addition to the main element extracted from the target element. In this case, a plurality of main elements are extracted from different regions of the web page. That is, a plurality of regions included in the web page serve as print targets. Furthermore, the plurality of main elements serving as print targets may be assigned to different layers.

As described above, in this embodiment, an element desired by the user can be automatically extracted and printed as an output target of a structured document. Furthermore, thumbnail images corresponding to a main element group which has been automatically extracted may be displayed as a list as output candidates and the user may select a desired one of the output candidates. Accordingly, the user can select a desired region to be output in the web page by a simple operation so that the region is output. Moreover, since a region of a selected main element can be controlled, a region to be output can be specified in detail for extraction.

Other Embodiments

Furthermore, the present invention may be realized by performing the following processing. That is, software (program) which realizes the functions of the foregoing embodiment is supplied to a system or an apparatus through a network or any storage medium, and a computer (or a CPU, an MPU, or the like) included in the system or the apparatus reads and executes the program. Furthermore, the present invention may be realized by executing processes by a plurality of processors such as a CPU, MPU, and the like in combination.

The present invention is not limited to the foregoing embodiment, and various changes and modifications may be made without departing from the spirit and the scope of the present invention. Therefore, the following claims are attached in order to publicize the scope of the present invention.

According to the present invention, an appropriate element can be selected and output from among a plurality of elements included in a structured document.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An apparatus comprising:
an obtaining unit configured to obtain information for specifying a size of an area corresponding to each of a first element corresponding to a first layer and a second element corresponding to a second layer lower than the first layer, the first element and the second element being included in a plurality of elements which are defined as a layer structure based on a structured document;
a selecting unit configured to, using at least one processor, in a case where a first size of a first area corresponding to the first element and a second size of a second area, included in the first area, corresponding to the second element are specified by the information obtained by the obtaining unit, select an output candidate element from the first element and the second element in accordance with a ratio of the first size and the second size, in response to input of an instruction by a user for executing selection of the output candidate element; and
an outputting unit configured to output the output candidate element selected by the selecting unit.

2. The apparatus according to claim 1,
wherein the outputting unit outputs the output candidate element and another element included in the structured document, distinctively from each other.

3. The apparatus according to claim 1, further comprising:
a changing unit configured to change the output candidate element in response to input of an instruction by a user, to another element included in the structured document.

4. The apparatus according to claim 1,
wherein the outputting unit causes a print device to print an image corresponding to the output candidate element selected by the selecting unit.

5. The apparatus according to claim 4,
wherein the outputting unit obtains a print setting representing a setting for causing the print device to perform printing, determines layout of the output candidate element selected by the selecting unit in accordance with the obtained print setting, and causes the print device to print an image corresponding to the output candidate element arranged in accordance with the determined layout.

6. The apparatus according to claim 1,
wherein the selecting unit further obtains information on content of text included in an element included in the structured document, and selects the output candidate element based on the ratio and the content of text corresponding to the element.

7. The apparatus according to claim 1,
wherein the first size is larger than a first predetermined size corresponding to the first layer, and the second size is larger than a second predetermined size corresponding to the second layer.

8. The apparatus according to claim 7,
wherein the first size is larger than a size corresponding to an element in the first layer, as the first predetermined size, and the second size is larger than a size corresponding to an element in the second layer, as the second predetermined size.

9. The apparatus according to claim 1, further comprising:
a comparing unit configured to compare the first size and the second size,
wherein the selecting unit selects the output candidate element based on the ratio of the first size and the second size obtained by comparing by the comparing unit.

10. The apparatus according to claim 9,
wherein the outputting unit outputs the output candidate element distinctively from a third element which is not compared with the first element.

11. The apparatus according to claim 1,
wherein the first element is a parent element to the second element.

12. The apparatus according to claim 1, further comprising:
a display control unit configured to cause a display screen to display a display item for designating the execution selection of the output candidate element by the selecting unit;
wherein the instruction by a user for executing selection of the output candidate element is input, in accordance with designation by the user to the display item displayed on the display screen by the display control unit.

13. The apparatus according to claim 12, wherein the structured document corresponds to a web page, and the display control unit causes the display screen to display the display item outside of the web page displayed in the displayed screen based on the structured document.

14. The apparatus according to claim 1, wherein the selecting unit automatically selects the output candidate element in response to input of an instruction by a user for executing automatic selection.

15. The apparatus according to claim 1,
wherein the outputting unit causes a display screen to display a region corresponding to the output candidate element selected by the selecting unit.

16. The apparatus according to claim 15, wherein the outputting unit causes the display screen to display the region corresponding to the output candidate element, and then to display a region corresponding to the other element of the first element and the second element in accordance with an instruction by a user.

17. The apparatus according to claim 16, wherein the outputting unit causes the display screen to display the region corresponding to the other element with the region corresponding to the output candidate element.

18. The apparatus according to claim 17, wherein the outputting unit causes the display screen to display a thumbnail image representing the region corresponding to the output candidate element and a thumbnail image representing the region corresponding to the other element, concurrently.

19. The apparatus according to claim 18, wherein the outputting unit outputs a plurality of selected output elements to a thumbnail list screen.

20. The apparatus according to claim 1, wherein the structured document corresponds to a web page, and the size of the area is a size of an area in a web page displayed by a web browser.

21. The apparatus according to claim 20, wherein the obtaining unit obtains the information from the web browser.

22. The apparatus according to claim 1, wherein the outputting unit outputs the output candidate element, and does not output another element included in the structured document.

23. The apparatus according to claim 22, wherein the outputting unit causes a display screen to display the output candidate element and does not cause to display the another element.

24. The apparatus according to claim 22, wherein the outputting unit causes a printing apparatus to print the output candidate element and does not cause to print the another element.

25. The apparatus according to claim 1, wherein the selecting unit selects the output candidate element, so that the first element is selected in a case where a ratio of the second size to the first size is smaller than a predetermined ratio, and that the second element is selected in a case where the ratio is not smaller than the predetermined ratio.

26. A method comprising:
obtaining information for specifying a size of an area corresponding to each of a first element corresponding to a first layer and a second element corresponding to a second layer lower than the first layer, the first element and the second element being included in a plurality of elements which are defined as a layer structure based on a structured document;
in a case where a first size of a first area corresponding to the first element and a second size of a second area, included in the first area, corresponding to the second element are specified by the obtained information, selecting an output candidate element from the first element and the second element in accordance with a ratio of the first size and the second size, using at least one processor, in response to input of an instruction by a user for executing selection of the output candidate element; and
outputting the selected output candidate element.

27. The method according to claim 26, further comprising:
comparing the first size and the second size to each other, wherein the output candidate element is selected based on the ratio of the first size and the second size obtained by the comparing.

28. The method according to claim 26, further comprising:
causing a display screen to display a display item for designating the execution selection of the output candidate element;
wherein, the instruction by a user for executing selection of the output candidate element is input, in accordance with designation by the user to the display item displayed on the display screen.

29. The method according to claim 26, wherein the output candidate element is selected automatically in response to input of an instruction by a user for executing automatic selection.

30. A non-transitory storage medium which stores a program which causes a computer to execute a method comprising:
obtaining information for specifying a size of an area corresponding to each of a first element corresponding to a first layer and a second element corresponding to a second layer lower than the first layer, the first element and the second element being included in a plurality of elements which are defined as a layer structure based on a structured document;
in a case where a first size of a first area corresponding to the first element and a second size of a second area, included in the first area, corresponding to the second element are specified by the obtained information, selecting an output candidate element from the first element and the second element in accordance with a ratio of the first size and the second size, using at least one processor, in response to input of an instruction by a user for executing selection of the output candidate element; and
outputting the selected output candidate element.

31. The non-transitory storage medium according to claim 30, further comprising:
comparing the first size and the second size to each other, wherein the output candidate element is selected based on the ratio of the first size and the second size obtained by the comparing.

32. The non-transitory storage medium according to claim 30, wherein the output candidate element is selected automatically in response to input of an instruction by a user for executing automatic selection.

33. A non-transitory storage medium storing a plug-in program which is for a web browser which displays a web page based on a structured document and causes a computer to execute a method comprising:
obtaining information for specifying a size of an area corresponding to each of a first element corresponding to a first layer and a second element corresponding to a second layer lower than the first layer, the first element and the second element being included in a plurality of elements which are defined as a layer structure based on the structured document;
in a case where a first size of a first area corresponding to the first element and a second size of a second area, included in the first area, corresponding to the second element are specified by the obtained information, selecting an output candidate element from the first element and the second element in accordance with a ratio of the first size and the second size, in response to input of an instruction by a user for executing selection of the output candidate element; and
outputting the selected output candidate element.

* * * * *